(12) United States Patent
Falossi et al.

(10) Patent No.: US 11,173,761 B2
(45) Date of Patent: Nov. 16, 2021

(54) INTEGRATED BEARING ELEMENT AND SUSPENSION UPRIGHT MODULE, AND METHOD OF PRODUCTION THEREOF

(71) Applicant: AKTIEBOLAGET SKF, Gothenburg (SE)

(72) Inventors: Marco Falossi, San Raffaele Cimena (IT); Paolo A Re, Nichelino (IT)

(73) Assignee: AKTIEBOLAGET SKF, Gothenburg (SE)

( * ) Notice: Subject to any disclaimer, the term of this patent is extended or adjusted under 35 U.S.C. 154(b) by 36 days.

(21) Appl. No.: 16/817,738

(22) Filed: Mar. 13, 2020

(65) Prior Publication Data
US 2020/0307332 A1 Oct. 1, 2020

(30) Foreign Application Priority Data
Mar. 25, 2019 (IT) .................. 102019000004251

(51) Int. Cl.
*B60G 7/00* (2006.01)
*F16C 35/067* (2006.01)

(52) U.S. Cl.
CPC ............ *B60G 7/001* (2013.01); *F16C 35/067* (2013.01); *B60G 2204/418* (2013.01);
(Continued)

(58) Field of Classification Search
CPC .... B60G 7/001; B60G 7/00; B60G 2204/418; B60G 2204/43; B60G 2206/50; B60G 2206/8101; F16C 33/581; F16C 2326/02; F16C 33/62; F16C 33/7826; F16C 33/783; F16C 35/067; F16C 2220/02;
(Continued)

(56) References Cited

U.S. PATENT DOCUMENTS

| 6,485,188 B1 | 11/2002 | Dougherty |
| 7,175,349 B2 | 2/2007 | Sakamoto |

(Continued)

FOREIGN PATENT DOCUMENTS

| EP | 2378142 A1 | 10/2011 |
| EP | 2378143 A1 | 10/2011 |

(Continued)

OTHER PUBLICATIONS

Written Opinion and Search report from the Italian Patent Office dated Nov. 11, 2019 in related Italian application No. 102019000004251, and partial translation thereof.

*Primary Examiner* — Darlene P Condra
(74) *Attorney, Agent, or Firm* — J-Tek Law PLLC; Scott T. Wakeman; Mark A. Ussai

(57) ABSTRACT

An integrated module for a vehicle suspension includes a bearing outer ring and a suspension upright or knuckle, the outer ring being formed of a first high-strength material, and at least part of the suspension upright or knuckle being made from a second, metallic material, the second material being lighter than the first material. The upright or knuckle is co-moulded radially onto the outside of the bearing and is directly fixed to the bearing ring by means of an interface for form coupling. Opposite axial ends of the bearing outer ring are configured to receive closing and sealing devices for protecting one or more races of the bearing outer ring during co-moulding and for removing heat from the races during co-moulding.

11 Claims, 3 Drawing Sheets

(52) U.S. Cl.
CPC ...... *B60G 2204/43* (2013.01); *B60G 2206/50* (2013.01); *B60G 2206/8101* (2013.01); *F16C 2220/02* (2013.01); *F16C 2326/05* (2013.01)

(58) Field of Classification Search
CPC .... F16C 2326/05; F16C 33/586; F16C 33/64; B22C 9/22; B22C 9/065; B62D 7/18; B22D 19/0081; B22D 19/16; B22D 19/04
See application file for complete search history.

(56) References Cited

U.S. PATENT DOCUMENTS

| | | | | |
|---|---|---|---|---|
| 8,944,523 | B2* | 2/2015 | Re | F16C 19/184 |
| | | | | 301/109 |
| 8,961,026 | B2* | 2/2015 | Re | F16C 33/581 |
| | | | | 384/544 |
| 2010/0021099 | A1* | 1/2010 | Torii | F16C 19/184 |
| | | | | 384/544 |
| 2010/0111458 | A1* | 5/2010 | Hirai | F16C 33/586 |
| | | | | 384/544 |
| 2012/0251026 | A1* | 10/2012 | Ferrero | F16C 33/64 |
| | | | | 384/515 |
| 2016/0159392 | A1* | 6/2016 | Hoffmann | B22D 18/04 |
| | | | | 280/93.512 |
| 2016/0207232 | A1 | 7/2016 | Hashimoto | |
| 2020/0047243 | A1* | 2/2020 | Reikher | B22D 19/08 |

FOREIGN PATENT DOCUMENTS

| | | |
|---|---|---|
| EP | 2505379 A1 | 10/2012 |
| EP | 2505380 A1 | 10/2012 |
| EP | 2505381 A1 | 10/2012 |
| EP | 2558737 A1 | 2/2013 |
| EP | 2558737 B1 | 6/2016 |
| WO | 2011127979 A1 | 10/2011 |
| WO | 2012122993 A1 | 9/2012 |
| WO | 2018085430 A1 | 5/2018 |

* cited by examiner

INTEGRATED BEARING ELEMENT AND SUSPENSION UPRIGHT MODULE, AND METHOD OF PRODUCTION THEREOF

CROSS-REFERENCE

This application claims priority to Italian patent application no. 102019000004251 filed on Mar. 25, 2019, the contents of which are fully incorporated herein by reference.

BACKGROUND OF THE INVENTION

The present invention relates to an integrated module for a vehicle suspension, consisting of a bearing element, particularly an outer ring of a rolling bearing, and a suspension upright or knuckle made in one piece with the bearing element and radially external to the bearing element. The invention also relates to a method for the production of this integrated module. It is well known that the motor industry has been placing an increasing emphasis on reducing the weight of vehicle components, with the aim of saving fuel. One such component is the steering knuckle, which connects the wheel bearing to the suspension of the vehicle; more generally, such components to be lightened include all the uprights of the vehicle suspension.

Lightweight steering uprights and knuckles are commonly made by casting from light alloy, usually aluminium-based.

Rolling bearings, usually of what is known as the HBU (Hub Bearing Unit) type, are subsequently fastened to these steering uprights or knuckles for supporting the vehicle wheels. The outer ring of each rolling bearing, made of steel, is made in one piece with a flange, which is fastened with screws to the steering upright or knuckle of the suspension.

However, the presence of the flange and the screws fastening the outer ring of the bearing to the steering upright or knuckle of the suspension greatly increases the overall weight of the vehicle suspension, and also increases the overall dimensions (thickness) of the functional unit formed by the bearing element and upright.

To overcome this problem, it has been proposed that the outer ring or other bearing element be integrated into the upright formed of a light alloy, by force-fitting or co-moulding the upright on to the bearing element, thereby avoiding the need for the flange and corresponding fastening screws.

In practice, however, such a solution is extremely difficult to provide.

In the case of mechanical force-fitting, a very high degree of interference must be provided, owing to the different coefficients of expansion of steel (from which the bearing element is made) and aluminium or light alloy (from which the upright is made), this interference creating considerable stresses that may lead to premature fracture in use or even during assembly.

In the case of co-moulding, it is essential, in the first place, to ensure that the radially outer surface of the bearing element is firmly fixed to the material of the steering upright or knuckle. To this end, U.S. Pat. No. 6,485,188 proposes to create a mechanical locking joint between a bearing element and an upright, formed by one or more projections of the radially outer surface of the bearing element which are embedded into the material of the steering upright or knuckle that is cast and moulded directly on to the bearing element. U.S. Pat. No. 7,175,349 proposes a similar solution, although here the upright is co-moulded on to an interface element formed by a sleeve made of steel, into which an ordinary rolling bearing or HBU is then force-fitted.

Secondly, even when a stable and direct connection is formed between the aluminium or light alloy upright and the steel bearing element, there remains the problem of ensuring the integrity and appropriate hardness of the races of the rolling bearing, which are usually formed from steel on a radially inner surface of the bearing element or outer ring.

The latter problem is present even if the joint between the suspension upright and the bearing element is made chemically, according to the technology described in WO2018/085430.

Consequently, there are no significant commercial applications of U.S. Pat. Nos. 6,485,188, 7,175,349 and WO2018/085430 in the context of the integration of a bearing element with a steering upright or knuckle of a vehicle suspension.

EP2505381, filed by the present applicant, discloses a mechanical coupling system between a bearing element or insert made of a bearing steel and a radially outer element made of a lighter metallic material such as aluminium or light alloy, which is intended to form a flange for attaching the bearing to the suspension upright. This solution can only partially reduce the weight of the conventional solutions (the weight of the attachment flange is reduced, but the weight of the fastening screws remains), and the problem of the large overall dimensions of the bearing/upright coupling persists. Furthermore, even if this solution were applied by fastening the bearing element directly to the suspension upright, there would still be the problem of ensuring chemical integrity, mechanical precision and sufficient hardness in the races of the bearing element.

SUMMARY OF THE INVENTION

One object of the present invention is to overcome the drawbacks of the prior art, and particularly to provide an integrated bearing element and suspension upright or knuckle module, and to provide a method for constructing the module, which are reliable, inexpensive, simple and quick to implement, particularly by avoiding the need to carry out mechanical machining or heat treatment after the production of the suspension upright or knuckle.

According to the invention, therefore, an integrated bearing element and suspension upright or knuckle module and a method for constructing the module are provided, with the characteristics stated in the appended claims.

BRIEF DESCRIPTION OF THE SEVERAL VIEWS OF THE DRAWINGS

The invention will now be described with reference to the appended drawings, which show a non-limiting example of its embodiment, in which.

DETAILED DESCRIPTION OF THE INVENTION

Figure 1:
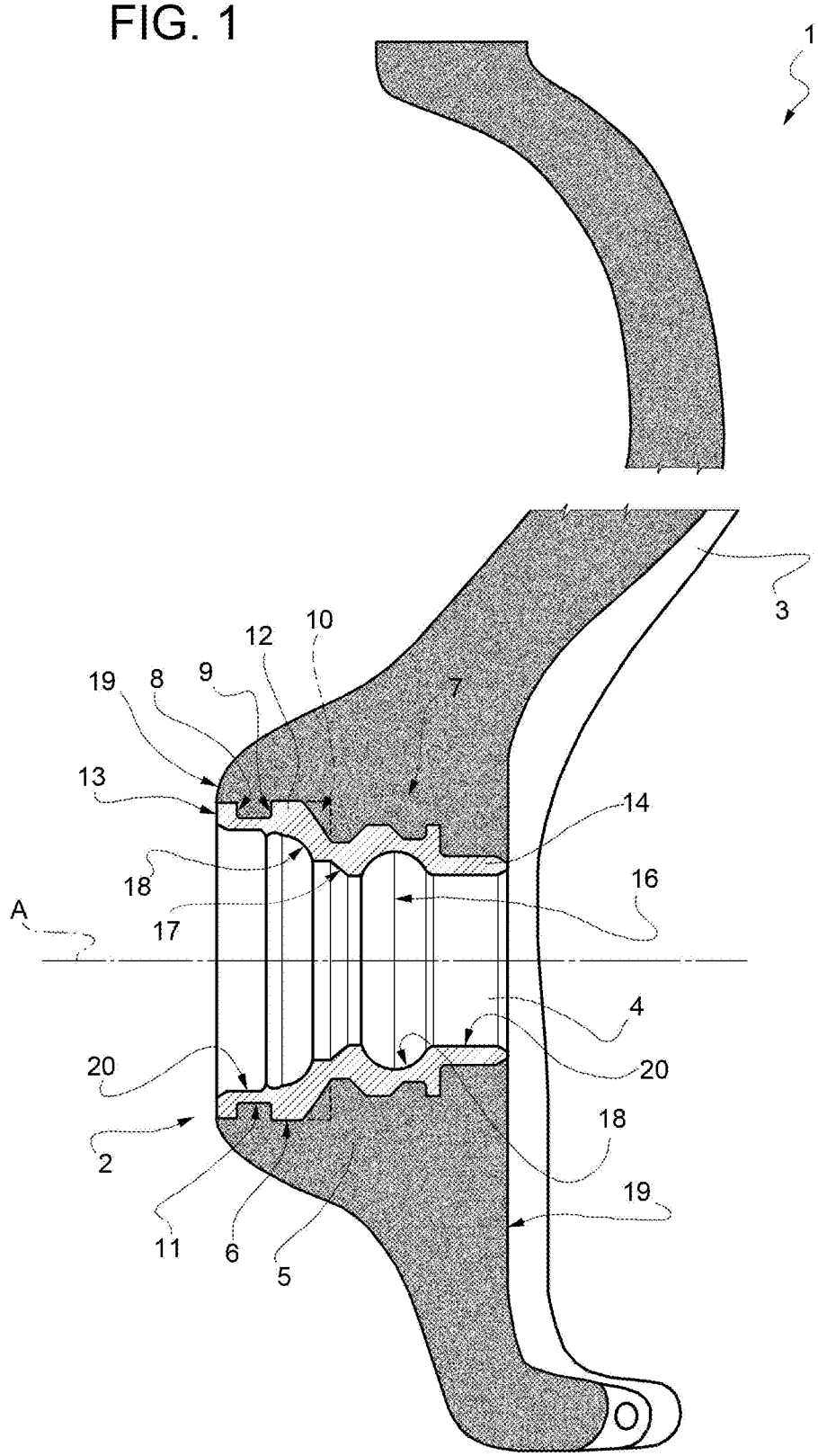
FIG. 1 shows schematically a longitudinal view in elevation and in section on an axial section plane, of an integrated bearing element and suspension upright or knuckle module, made according to the invention.
Figure 2:
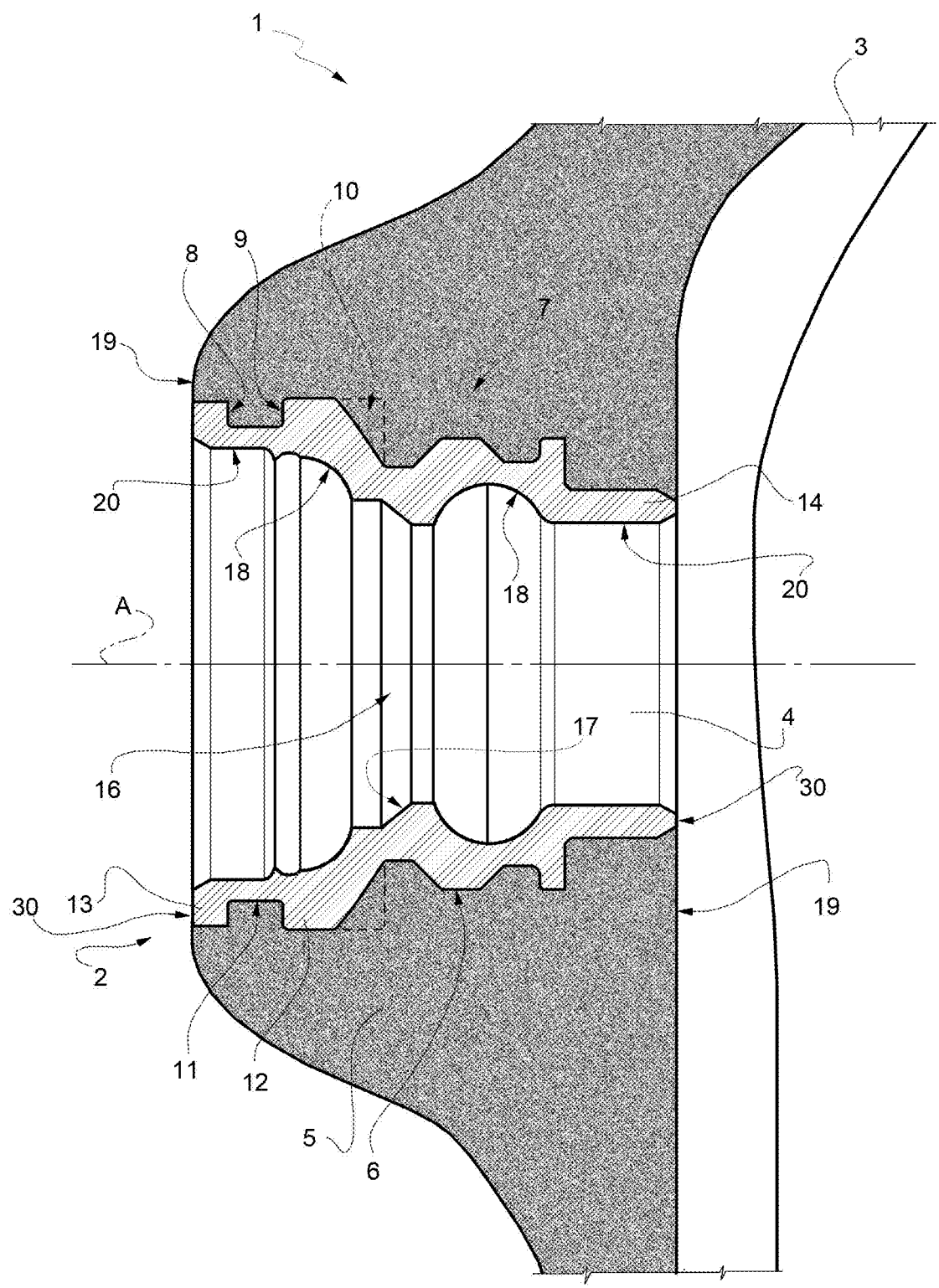
FIG. 2 shows schematically, on an enlarged scale, a detail of FIG. 1.

With reference to FIGS. 1 and 2, these indicate by the number 1 the whole of an integrated bearing element and suspension upright or knuckle module for a suspension of a vehicle of any type, the types of vehicle being known and, for simplicity, not illustrated.

The integrated module 1 comprises a bearing element 2 and a suspension upright or knuckle 3, shown purely schematically and, for simplicity, only partially.

In the illustrated non-limiting example, the suspension upright or knuckle (that is to say, an upright which is intended for steered wheels and therefore is also provided with lateral arms for connection to the steering mechanism) 3 is made in one piece, but the following description is also applicable to uprights made in two or more pieces that can be connected together, if necessary.

According to a first characteristic of the invention, the bearing element 2 is a complete outer ring 4 (or at least a part thereof) of a rolling bearing (not illustrated, for simplicity).

The outer ring 4 is made of a first material having a high strength, such as a bearing steel. According to the preferred embodiment of the invention, the outer ring 4 is made by mechanical machining of a standard steel for bearings ("bearing grade steel").

On the other hand, the suspension upright or knuckle 3 is made entirely, or at least in one of its parts 5 adjacent to the outer ring 4 if it is made, according to an alternative embodiment which is not illustrated for simplicity, in two or more parts as indicated above, of a second material, which is a metallic material that is lighter than the first material, such as a light alloy. In the preferred embodiment, the upright 3 is made by cast moulding in one piece, directly co-moulded radially on to the outside of the bearing element 2 (by an overmoulding operation), from aluminium or alloys thereof or from any other light alloy suitable for the specific application. Potentially suitable cast moulding processes comprise high pressure casting (with or without the formation of a vacuum in the mould), low pressure casting, and semi-solid casting.

The suspension upright or knuckle 3, or at least the part or portion 5 thereof, is directly fixed mechanically to a radially outer, circumferential surface 6 of the outer ring 4 of the rolling bearing by means of an interface 7 for form coupling. The interface 7 includes at least a pair of opposite axially-facing or "axial" shoulders 8 and 9, extending circumferentially at least partially about an axis of symmetry A to prevent relative axial displacement, and a plurality of circumferential shoulders 10, each extending along the axis A and preventing relative angular displacement about the axis A, all formed and spaced apart on the radially outer surface 6 of the outer ring 4 of the rolling bearing.

In the non-limiting example illustrated, the axial shoulders 8 and 9 are provided by opposite sides of an annular channel 11 formed in an annular projection 12 of the outer surface 6, the annular projection 12 extending radially outwards from the surface 6 on the opposite side from the axis of symmetry A of the outer ring 4.

In the illustrated example, additionally, the circumferential shoulders 10 are formed by respective flats formed on a radially outer terminal edge of the annular projection 12, extending axially in the opposite direction from the annular channel 11.

Thus, a firm and permanent mechanical connection is provided between the upright 3 and the bearing element 2 in both and axial and a circumferential direction, so that the shoulders 10 form a means to prevent rotation about the axis A.

More generally, the interface 7 is made, preferably but not necessarily, according to the teachings of EP2505381 (published on 3 Oct. 2011), the entire contents of which are incorporated herein by reference.

According to a further characteristic of the invention, and in combination with the other characteristics described above, opposite axial ends 13 and of the outer ring 4 of the rolling bearing are configured to receive, during an operation (described in detail below) of co-moulding at least the part 5 of the suspension upright or knuckle 3 over and all around the bearing element 2 (FIG. 3), respective closing and sealing devices 15.

The closing and sealing devices 15 are configured in the form of a plug, cap, or any other element suitable for closing in a fluid-tight manner an inner compartment 16 of the outer ring 4 of the rolling bearing, this compartment being provided with corresponding races 18 of the bearing element 2, configured to receive, in a known way, known rolling bodies (which are balls in the illustrated example, but could also be tapered or spherical rollers) which for simplicity are not illustrated, for supporting a wheel hub in rotation, this hub also being known and not illustrated for simplicity.

The suspension upright or knuckle 3 is preferably, but not necessarily, entirely co-moulded over and around the bearing element 2 so that (FIGS. 1 and 2) at least a first axial end 13 of the outer ring 4 of the rolling bearing, facing towards the outside of the vehicle in use (on the "outboard" side), is preferably, but not necessarily, positioned flush with a corresponding first end 19 of the suspension upright or knuckle 3. Conversely, the second axial end 14 of the outer ring 4 may equally well be formed flush with an inner side 19 of the suspension upright or knuckle 3, as shown in FIG. 2, or, in a possible variant, not illustrated for simplicity, may be formed so as to be separated from the inner side 19, so as to leave an empty annular compartment between the end 14 and the inner side 19.

The opposite axial ends 13 and 14 of the outer ring 4 of the rolling bearing each delimit between them a respective recess 20 configured to receive in contact a first end 21 (FIG. 3) of a respective closing and sealing device 15, while a second end 22 of each closing and sealing device 15, opposite the first end 21, is coupled to and abuts the respective axial end 13, 14 of the outer ring 4 of the rolling bearing.

According to one aspect of the invention, each recess 20 extends axially to the immediate proximity of a respective race 18 of the bearing element 2, so that the closing and sealing devices 15 can/are able to remove heat from the races 18 during the co-moulding of the suspension upright or knuckle 3 over the bearing element 2.

Figure 3:
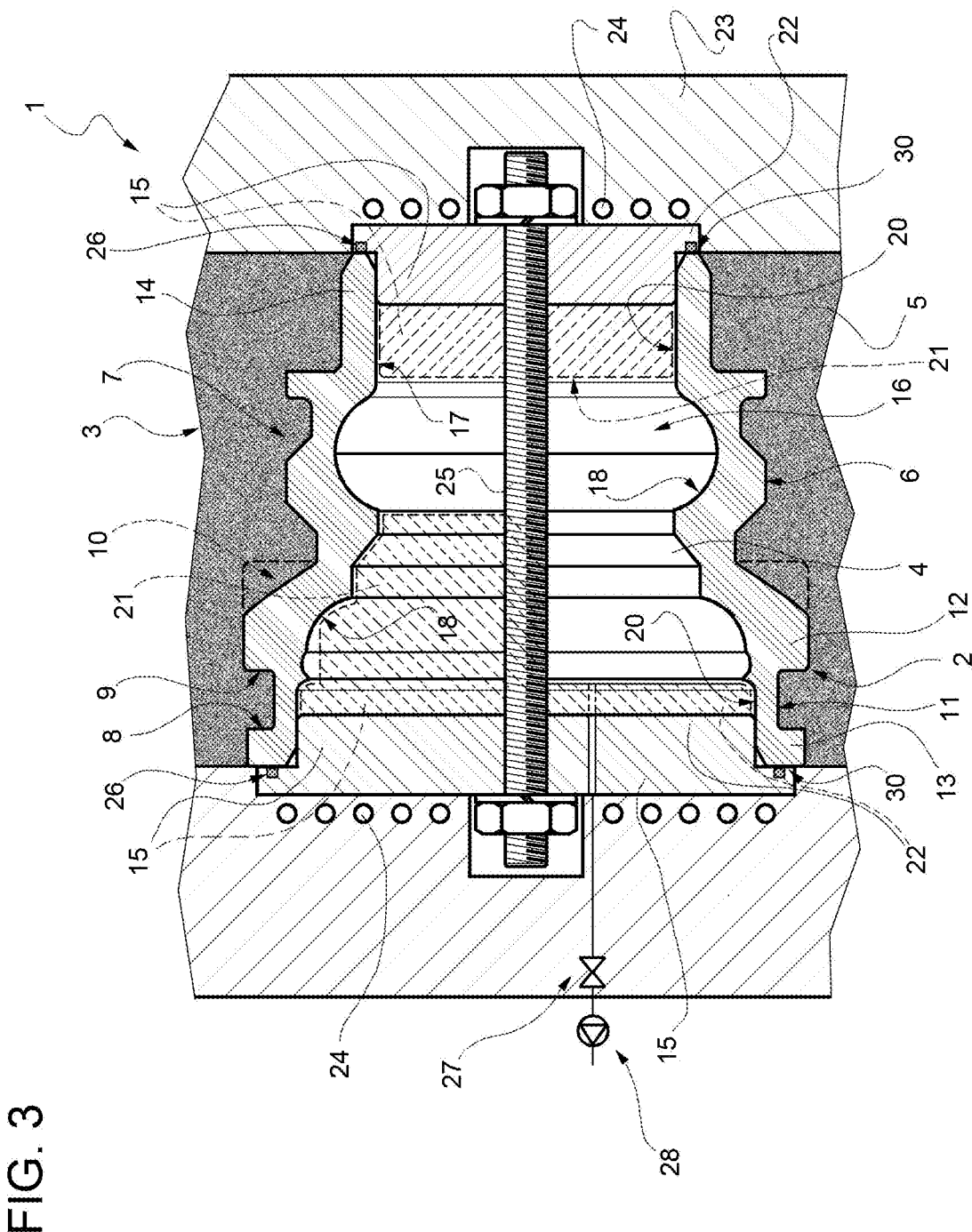
FIG. 3 shows schematically and in axial section a view in elevation of a step in the production of the integrated bearing element and suspension upright or knuckle module of FIGS. 1 and 2.

As shown schematically in broken lines in FIG. 3, one of the closing and sealing devices 15, namely the one mounted in the recess 20 of the end 13 in the non-limiting illustrated example, may have its end 21 extended to beyond at least one of the races 18, in the illustrated example the race 18 facing towards, or positioned on the side nearer to, the end 13, as far as the other race 18, which in the illustrated example is the race 18 facing towards, or positioned on the side nearer to, the end 14.

According to another aspect of the invention, alternatively or in addition to the previous characteristic, the bearing element 2 is made of hardened bearing steel and is selected so as to have a tempering temperature similar to a casting temperature of the second material, in other words the metallic material (light alloy) from which the suspension upright or knuckle 3 is made.

The closing and sealing devices 15 essentially have three functions:

protecting against external agents, preventing the loss, by leakage or evaporation, of protective fluids applied on or in the races 18, dissipating the heat transmitted from the cast material during cooling to the insert formed by the bearing element 2.

The configuration of the closing and sealing devices 15 is therefore such as to maximize the surface area in contact with the insert formed by the bearing element 2, or by an outer ring 4 of a rolling bearing (as shown in broken lines in FIG. 3), while providing a fluid-tight seal.

One of the elements in contact, from among the closing and sealing devices 15 and the ends 13, 14 and/or a radially inner surface 17 of the outer ring 4, the surface 17 extending circumferentially about the axis A, on which the races 18 are also formed, may, for example, be provided with sealing elements 26 such as resilient high-temperature gaskets, typically made of silicone materials, to provide a fluid-tight seal and prevent the outflow of protective fluids applied to the inner surface 17.

This is because the surface 17, and especially the races 18, must be shielded not only from possible impact or debris that may adversely affect their geometric regularity, but also from any possible damage from a corrosive agent, in view of the fact that the production of the combined bearing element 2 and outer ring 4 forming the insert of the invention is likely to take place at a site other than that where overmoulding operations are carried out. The combined ring 4 and bearing element 2 is therefore provided with the protective elements formed by the closing and sealing devices 15 at the end of the line, possibly by means of robotic devices or manual operation support devices (cobots), because of the weight of the parts to be handled and the high production rate, in order to protect it in transit to the moulding site, the operations on the line and the return to the final assembly site.

As regards the geometry of the closing and sealing devices 15, since the axial bearing force in closing will be exerted on radial surfaces 30 of the ends 13, 14 (which, in the non-limiting illustrated example, also receive the gaskets 26), contact with the inner surface 17 cannot be ensured by the combination of the machining tolerances of the combined ring insert 4 and bearing element 2 itself and of the sealing elements 26. To achieve high heat dissipation in all circumstances, the surface 17 of the combined ring 4 and bearing element 2 and the sealing elements 26 are treated/coated with highly heat conductive grease or paste (not illustrated for simplicity). Such materials are typically made with a silicone- or urethane-based matrix, with highly heat-conductive fillers such as aluminium or zinc oxide. The grease or past compound can be used to take up the play between the surfaces not in contact, while providing high heat transmission and achieving the desired effect.

As regards the protection of the races 18, these are coated, as mentioned above, with a suitable protective fluid (not illustrated for simplicity), preferably consisting of low viscosity, dearomatized hydrocarbon solvents.

In addition to the protective fluid for the inner surface 17 and the races 18, the described configuration of the closing and sealing devices 15 enables the inner cavity or compartment 16 to be evacuated to minimize the oxidation of the metal surfaces.

For this purpose, one of the two closing and sealing devices 15 is provided (FIG. 3) with a check valve 27 (illustrated only schematically), by means of which the inner chamber can be made to communicate with a vacuum line 28, either at the end of the line or before the overmoulding operation. The check valve 27 enables the internal vacuum to be maintained in all the steps of machining that will now be described.

It is clear from the above description that the invention also relates to a method for producing the integrated module 1 for a vehicle suspension comprising a bearing element 2 and a suspension upright or knuckle 3, in which the bearing element 2 is an outer ring 4 of a rolling bearing having races 18 which, as is known, must have a high level of hardness and are therefore hardened.

The method according to the invention comprises the following steps.

A first step for mechanically forming the outer ring 4 of a rolling bearing in a finished configuration, in which the respective races 18 of the bearing element 2 have a shape and dimensions and surface characteristics (hardness and roughness) identical to the design characteristics, subject to the usual machining tolerances.

This first step is also executed in such a way that a radially outer surface 6 of the bearing element 2 or outer ring 4 has an interface 7 for form coupling, including at least a pair of opposite axial shoulders 8, 9 and a plurality of circumferential shoulders 10, according to EP2505381 for example.

A second step for sealing respective opposite axial ends 13, 14 of the outer ring 4 of a rolling bearing with respective closing and sealing devices 15 (consisting, in the non-limiting illustrated example, of a kind of highly thermally conductive "plug" provided with gaskets 26), so as to close, in a substantially fluid-tight way, an inner compartment 16 of the outer ring 4 of the rolling bearing housing the races 18.

A third step for inserting the outer ring 4 of a rolling bearing, with the closing and sealing devices 15 already applied to it, into a mould 23, in the manner shown schematically in FIG. 3.

A fourth step, for radially co-moulding on to the outside of the bearing element 2 at least the part 5 of a suspension upright or knuckle 3, by casting a light alloy into the mould 23 so as to incorporate into it the form coupling interface 7.

According to one aspect of the invention, the closing and sealing devices 15 are made of a material which is a good heat conductor, preferably a metallic material.

Additionally, the recesses 20 are configured to receive the respective closing and sealing devices 15, in contact (subject to the limits described above) and with thermal coupling, and the closing and sealing devices 15 have their first ends 21 inserted into the respective recesses 20, preferably over the whole length of the ends 21 and possibly beyond the recesses 20.

The recesses 20 are also configured to extend axially to a point in the immediate proximity of the respective races 18 of the bearing element 2, and to receive (as shown in broken lines in FIG. 3) the first ends 21 of the closing and sealing devices 15, over their whole axial extension or possibly beyond.

In combination with the above, the second end 22 of the closing and sealing devices 15, opposite the first end 21 and having a radial extent (e.g., an outside diameter) greater than the radial extent of the ends 21, is configured to be coupled to and abut a corresponding axial end 13 or 14 of the outer ring 4 of the rolling bearing.

Thus the closing and sealing devices 15 are able to remove from the races 18 any heat transmitted to them during the step of co-moulding of the suspension upright or knuckle 3 by casting over the bearing element 2.

In order to improve the cooling of the races 18 during the co-moulding step (and during any step of heat treatment T6 of the aluminium or aluminium alloy from which the upright 3 is made), the mould 23 is provided with a cooling circuit 24 positioned near the second ends 22 of both the closing and sealing devices 15, this circuit being used during the co-moulding step to remove from the closing and sealing devices 15 the heat removed by them from the races 18.

As a result of these arrangements, according to a further aspect of the invention, the bearing element 2, before the co-moulding step, is hardened at the races 18 at least, and a tempering or stress-relieving heat treatment is also carried out on the bearing element 2 if necessary, to eliminate any internal stresses left by the hardening process.

According to another aspect of the invention, before the insertion of the closing and sealing devices 15 into the recesses 20 the races 18 are filled with a protective substance of a known type such as low-viscosity dearomatized hydrocarbon solvents, to prevent their oxidation or other possible surface damage. The closing and sealing devices 15 are then coupled to the opposite axial ends 13, 14 of the outer ring 4 of the bearing, so as to retain any vapours generated by the protective substance during the co-moulding inside the bearing element 4.

The closing and sealing devices 15 are interconnected and pressed against the opposite axial ends 13, 14 of the outer ring 4 of the rolling bearing by means of a pull bolt (FIG. 3) which passes axially through the bearing element 2 coaxially with the axis A.

As an alternative to the above, or additionally, the bearing element 2, before the co-moulding step, is hardened at least on the races 18, but without any tempering or stress relieving heat treatment, since the steel from which the bearing element 2 is made is selected to have a tempering or stress relieving temperature close to a casting temperature of the light alloy from which at least the part 5 of the suspension upright or knuckle 3 is made.

Therefore, during the co-moulding step (and/or any step of heat treatment T6 of the light alloy from which the upright 3 is made), the hardened races 18 retain their hardness, while the outer ring 4 of the rolling bearing is subjected, because of the heat transmitted by the material of the suspension upright or knuckle 3, to a tempering/stress relieving heat treatment, which eliminates the internal stresses and provides a considerable acceleration of the production process, since two different and necessary steps are executed simultaneously.

As a result of the technology described above, all the drawbacks of the known art are eliminated, while the production process can also be simplified and accelerated, thus reducing its costs and producing a high-quality monolithic product (the integrated module 1).

All the objects of the invention are therefore achieved.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide an improved integrated module for a vehicle suspension.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

We claim:

1. An integrated module for a vehicle suspension comprising:
   a bearing outer ring having a radially outer surface, opposite axial ends and at least one race in an inner compartment, the bearing outer ring being formed of a first, high strength material; and
   a suspension upright or knuckle radially co-moulded on the outside of the bearing outer ring at least part of the suspension upright or knuckle being formed of a second material, the second material being metallic and lighter than the first material;
   wherein the at least part of the suspension upright or knuckle is directly mechanically constrained to the radially outer surface of the bearing outer ring by means of a form-coupling interface; and
   wherein the opposite axial ends of the bearing outer ring are each configured to receive a separate one of two closing and sealing devices to fluid-tight close the inner compartment of the bearing outer ring during co-moulding of the at least part of the suspension upright or knuckle about the bearing outer ring.

2. The integrated module for a vehicle suspension according to claim 1, wherein the suspension upright or knuckle is entirely co-moulded about the bearing outer ring and at least one axial end of the bearing outer ring is configured to face the outboard side of the vehicle during use and is flush with a corresponding first end of the suspension upright or knuckle.

3. The integrated module for a vehicle suspension according to claim 1 wherein each one of the opposite axial ends of the bearing outer ring delimits a separate recess configured to receive a first end of one of the closing and sealing devices when a second, opposing end of the closing and sealing device is abutted against the respective axial end of the bearing outer ring, each recess extending axially to one of two races of the bearing outer ring so that the closing and sealing devices remove heat from the races during the co-moulding of the suspension upright or knuckle about the bearing element.

4. The integrated module for a vehicle suspension according to claim 1 wherein the form-coupling interface is provided by at least one pair of opposite axial shoulders and a plurality of circumferential shoulders formed on the radially outer surface of the bearing outer ring.

5. The integrated module for a vehicle suspension according to claim 1 wherein the bearing outer ring is made of hardened bearing steel having a quench temperature with a value of about a value of a casting temperature of the second material.

6. A method for producing an integrated module for a vehicle suspension comprising the steps of:

providing a bearing outer ring with a radially outer surface and two opposite axial ends and two closing and sealing devices;

forming a form-coupling interface on the bearing outer surface, the interface including at least one pair of opposite axial shoulders and a plurality of circumferential shoulders;

inserting each one of the closing and sealing devices into a separate one of the two opposite axial ends of the bearing outer ring so as to substantially close in a fluid-tight manner an inner compartment of the bearing outer ring;

inserting the bearing outer ring with the closing and sealing devices in a mould; and co-moulding at least part of a suspension upright or knuckle radially about the outer surface of the bearing outer ring by casting a lightweight alloy into the mould so as to incorporate the form-coupling interface into the at least part of a suspension upright or knuckle.

7. The method according to claim 6, wherein:
the bearing outer ring has an inner circumferential surface providing two bearing races and two recesses, each recess extending between a separate one of the two opposite axial ends and a separate one of two races;

each of the closing and sealing devices is made of a heat conductive material and has a first end and an opposing second end, the second end having a radial extent greater than a radial extent of the first end; and the closing and sealing devices are each inserted into a separate one of the two opposite axial ends of the bearing outer ring such that the first end of each closing and sealing device is in contact with or in thermal coupling with a separate one of the two bearing recesses while the second end of each closing and sealing device couples in abutment against a separate one of the two opposite axial ends of the bearing outer ring so that the closing and sealing devices are adapted to remove heat transmitted to the races during the co-moulding of the suspension upright or knuckle upon the bearing outer ring.

8. The method according to claim 7 wherein the mould is provided with a cooling circuit arranged in the vicinity of the second ends of the closing and sealing devices and which is used during co-moulding to remove heat from the closing and sealing devices.

9. The method according to claim 7 wherein:
the races are filled with a protective substance before insertion of the closing and sealing devices; and the closing and sealing devices are each coupled with one of the two opposite axial ends of the bearing outer ring so as to retain vapours generated by the protective substance during co-moulding.

10. The method according to claim 6 wherein the closing and sealing devices are connected to one another and pressed against a separate one of the two opposite axial ends of the bearing outer ring by means of a pull bolt which extends axially through the bearing outer ring.

11. The method according to claim 6 wherein:
the bearing outer ring has at least one race and the at least one the race of the bearing outer ring is hardened without any thermal treatment of tempering or stress-relieving prior to co-moulding; and the bearing outer ring is formed of a steel having a tempering or stress-relieving temperature of about a casting temperature of the lightweight alloy used to cast the suspension upright or knuckle.

\* \* \* \* \*